March 12, 1957

S. BAKEWELL 2,784,951

MIXING MACHINE

Filed June 29, 1956

INVENTOR
SIDNEY BAKEWELL.
BY
Robert A. Sloman
ATTORNEY

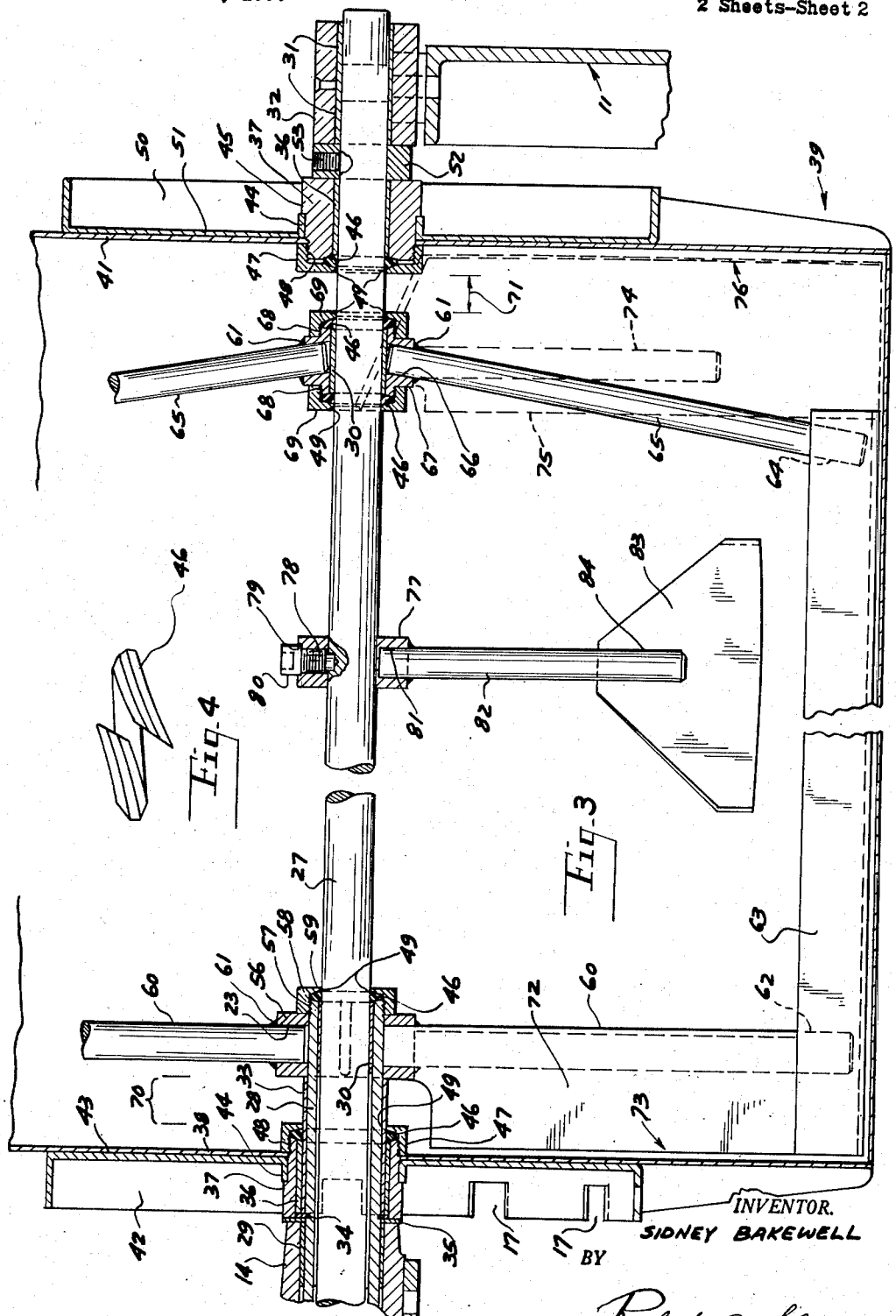

United States Patent Office 2,784,951
Patented Mar. 12, 1957

2,784,951

MIXING MACHINE

Sidney Bakewell, Detroit, Mich.

Application June 29, 1956, Serial No. 594,732

5 Claims. (Cl. 259—105)

This invention relates to a mixing machine and more particularly a device particularly adapted for mixing chopped foods such as meat, though the mixing character and efficiency of the machine is such that other substances may be effectively and homogeneously mixed.

This application is a continuation in part of my co-pending patent application S. N. 430,887, filed May 19, 1954, relating to a mixing machine and represents certain improvements primarily directed to important features of sanitation and cleanliness.

Heretofore in constructions of this type difficulties have been encountered in providing a machine which is easily cleanable or sterilizable and which will eliminate recesses and openings and the like within which harmful bacteria may accumulate.

It is primarily the object of the present invention to incorporate certain structure features including the use of stainless steel to thereby provide a more effective and more sanitary mixing machine.

It is the further object of the present invention to employ neoprene gaskets which cannot become impregnated with bacteria.

In this connection it is the further object to provide for their removal and replacement without complete disassembly of the machine by the use of suitable gasket nuts, together with such space as will permit their disconnection from adjacent parts without disassembly.

It is the further object to provide a novelty type of gasket and assembly and gasket nut construction which incorporates an internal shaft or sleeve wiping annular flange to further assure cleanliness and ease of cleaning.

These and other objects will be seen from the following specifications and claims in conjunction with the appended drawings in which:

Fig. 3 is a fragmentary vertical section of the central internal portions of the hopper including drive shaft and drive tube and the various sealing and bearing assemblies.

Fig. 4 is a top perspective view of the angular split gasket as spread for assembly.

It will be understood that the above drawings illustrate merely a preferred embodiment of the invention and that other embodiments are completed within the scope of the claims hereafter set forth.

Figure 1:
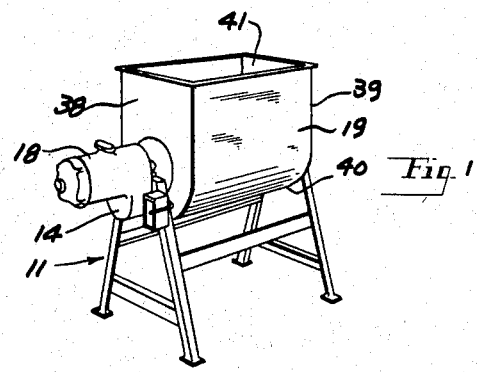
Fig. 1 is a perspective view of the mixing machine.
Figure 2:
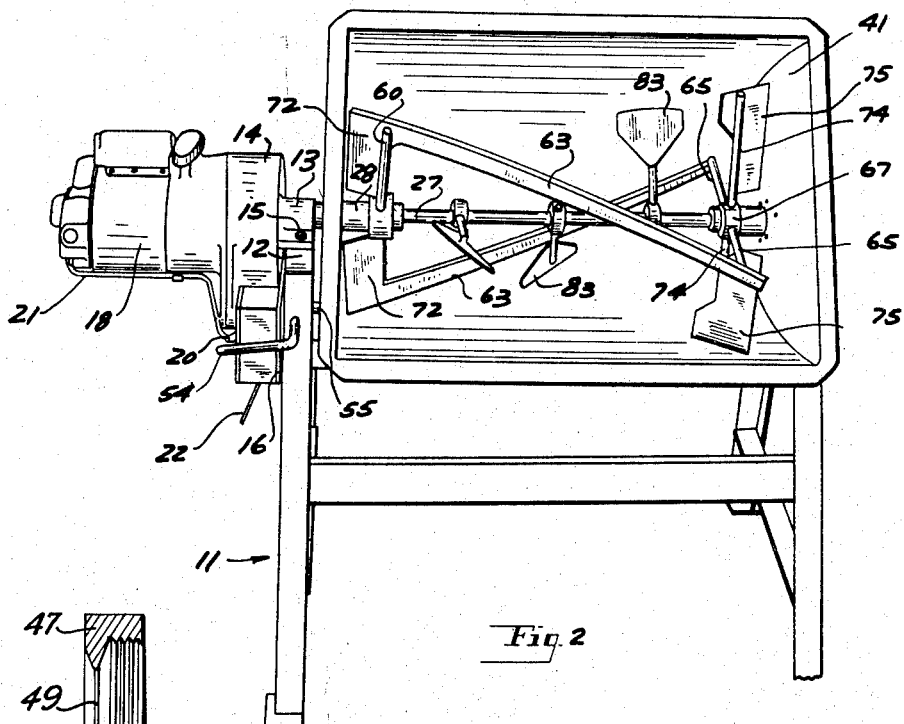
Fig. 2 is a perspective view of the machine on a larger scale and looking down into the hopper.
Figure 5:
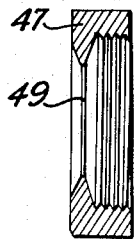
Fig. 5 is a vertical section illustrating the gasket nuts 47, 58, 69 in Fig. 3, on an enlarged scale.

Referring to Figures 1 and 2 there is shown the present mixing machine with mounting frame generally indicated at 11 and at the upper end thereof at 12 Figure 2 the mounting of gear housing hub 13 thereon as by the fasteners 15.

Gear housing 14 is arranged at one end of frame 11 and bears against upright plate 16 secured upon one end of said frame.

Motor 18 is joined to said gear housing axially and electrical connection thereto through the lead wires 21 and 22 is controlled by switch 20 mounted upon plate 16.

In a conventional manner the power from motor 18 is transmitted through gear housing 14 so as to effect rotation in one direction of the elongated drive shaft 27, which extends through the hopper of the machine. Said gear housing also provides a rotative drive in the opposite direction of sleeve 28 which is arranged axially of shaft 27 with suitable bushing or bearing 30 interposed as shown in Fig. 3.

As shown at the left end of Fig. 3 a suitable bushing 29 is interposed between sleeve 28 and gear housing 14.

Suitable bearings or bushings 31 receive the opposite end of shaft 27 and are supported within the end bearing 32 mounted upon the opposite end of frame 11.

The stainless steel spacing sleeve 33 is tightly secured over rotatable sleeve 28 and is retained against axial displacement outwardly of shaft 27 by the split ring 34, which is nested within a suitable annular slot in sleeve 28. Said ring bears against thrust washer 35 which surrounds sleeve 28 and bears against the end wall of gear housing 14.

A tank mounting bushing 37 is loosely mounted around sleeve 28 and carries the stationary bearing 36 mounted on spacer sleeve 33.

The said bushing 37 projects partially through annular flange 44 on rock control disc 42 and through the central aperture in end wall 38 which forms a part of the tank or mixing hopper, said end wall being suitably secured as by welding to the said disc 42, along the line 43.

As shown in Fig. 1 a second upright end wall 41 is provided for hopper 39, which also includes the upright side walls 19 which terminate at their lower ends in the semi-cylindrical bottom wall 40, completing the hopper construction.

Accordingly the said hopper or tank is supported at its opposite ends for tilting movement as desired by means of a second tank bushing 37, shown at the right end of Fig. 3, which carries internal bearing 36 through which extends drive shaft 27.

Here the tank bushing also projects inwardly through the outwardly projecting flange 44 of end wall reinforcing disc 50 and through the corresponding end wall 41, which is secured to said disc as by welding along plane 51.

A suitable angular split type annular gasket 46 preferably constructed of neoprene, for example, is employed for effecting the required seals in the present construction. For this purpose such a seal 46 is mounted around sleeve 33 upon the interior of the hopper and bears against the threaded reduced end 48 of tank bushing 37 and is removably secured thereto by the gasket nut 47 which is threadedly secured onto the said tank bushing.

Gasket nut 47 has an inwardly directed gasket retaining flange which terminates in the annular thin wiping edge 49 which cooperatively yet loosely engages sleeve 33 as at left end of Fig. 3.

A similar gasket 46 bears against the inner end of the right end tank bushing 37 and is likewise removably retained by the gasket nut 47 and which also has the above described internal wiping blade or edge 49.

The primary and important purpose of these annular wiping edges is to prevent the movement of the material mixed along said shaft 27 into the bearing assembly adjacent thereto and at the same time to prevent the accumulation of harmful bacteria therein.

The mounting assembly of the hopper 39 with respect to shaft 27 and drive sleeve 28 is completed by the thrust collar 52 shown at the right end of Figure 3, mounted on shaft 27, secured thereto of set screw 53 and bearing against tank bushing 37.

Control arm 54 shown in Figure 2 at the upper left end of frame 11 projects thereinto and carries the forwardly extended key 55 which is selectively positionable within one of the notches 17 formed in control disc 42. By this construction hopper 39 may be retained in the upright position shown in Fig. 1 or may be tipped and secured in one of several angular positions.

The hub 56 is mounted on drive sleeve 28 at the left end of Fig. 3 and is suitably secured thereto, and bears against spacer sleeve 33. Said hub projects past threaded end 57 of sleeve 28 against the end of which is positioned another split gasket 46 which acts as a seal with respect to shaft 27. The gasket is secured in position by the gasket nut 58 which is threaded upon the end threads of sleeve 28.

Said nut includes the internal flange 59 which terminates in the annular shaft wiping edge 49 above described.

A pair of oppositely directed spiral blade mounting first supports 60 project at their inner ends within apertures 23, formed in hub 56 and are fixedly secured thereto by the welds 61.

The said first supports are adapted to mount respectively at their outer ends, the inner ends of a pair of spiral blades 63 as at the points 62. One such blade is shown in Fig. 3. However the pair of such blades and their arrangement with respect to shaft 27 are best illustrated in Fig. 2.

The opposite ends of said blades are respectively secured at 64 to the outer ends of the second pair of oppositely arranged supports 65. These supports at their inner ends are snugly projected within opposed apertures 66, formed in rotatable hub 67, which carries the internal bushing 30 journalled upon shaft 27.

Hub 67 at its opposite ends has axially projected threaded portions 68 against whose ends bear the split gaskets 46 which seal around shaft 27 and are retained by the gasket nuts 60, which are threaded to the said hub. These gasket nuts likewise include the annular web which retains the said gasket and which terminates in the annular wiping edge 49, which cooperatively engages shaft 27 for the purposes above described.

In this connection and referring to Figure 2, the second supports 65 are arranged at right angles with respect to the first supports 60 and provide the means for rotatively journaling the said pair of oppositely arranged spiral blades 63 joined to and driven by power operative sleeve 28 within hopper 39.

At the upper left end of Fig. 3, at 70 there is designated an important space by which the adjacent gasket retaining nut 47 may be unthreaded axially to permit the removal of gasket 46 for cleaning or replacement without otherwise disassembling the remainder of the hopper construction.

A similar space 71 is indicated at the right end of Fig. 3 whereby the adjacent gasket retaining nuts 69 and 47 may be axially unthreaded to permit removal and exchange of the split gasket 46, or for cleaning purposes without disassembly of the remainder of the construction.

As shown in Fig. 2 there are provided adjacent and upon first supports 60 a pair of angularly related blades 72, which form continuations of the ends of spiral blades 63 and which are suitably secured to first supports 60. The said blades are also arranged at an acute angle with respect to the axis of shaft 27. Said blades have outer radial edges 73 which are adapted for cooperative close sweeping movement with respect to end wall 38 of the hopper.

These blades not only prevent the accumulation of food material or other material being mixed upon end wall 38, but are so arranged as to effect a reversal of movement of the said material as it engages end wall 38.

In the operation of the present mixer there are provided a series of angularly related paddle blades 83 of less radial length than the radial distances of the said spiral blades 63, secured to shaft 27 for corresponding rotation therewith in a direction opposite to the direction of rotation of said spiral blades.

Each of the said paddle blades is secured at 84 upon the outer ends of the arms 82 whose inner ends project within apertures 81 on the mounting collars 77, arranged in spaced relation upon shaft 27 and immovably secured thereto by the set screws 78.

Here also an additional sanitary feature resides in the fact that the head 80 of the set screw has a tight fit within the counterbore 79 within collar 77 to thus prevent the accumulation of harmful bacteria and to further assure the desired cleanliness.

A third pair of support rods 74 are arranged at the right end of the hopper as shown in Fig. 2 and at their inner ends are secured to hub 67 at right angles to the second supports 65.

A pair of angularly related blades 75 are mounted upon supports 74 and extend radially thereof. Said blades include the upright radial edges 76 which are adapted for close sweeping relation with respect to the other end wall 41 of said hopper. Here also blades 75 are arranged at an acute angle with respect to the axis of shaft 27 and in addition to the wiping function serves an additional function of effecting a reversal of movement of the material being mixed.

With the simultaneous rotation in opposite directions of the paddles 83 with respect to blades 63 the material being mixed is moved longitudinally of the hopper first in one direction and then in the other, to provide thorough mixing.

The respective blades 72 and 75 cooperate to effect reversal of movement of the material being mixed.

To facilitate cleaning the walls of the hopper were made of stainless steel as are also the gasket nuts and the hubs and all other parts where possible to thus provide an extremely sanitary food mixing machine which is easily cleanable and omits crevices and apertures within which food or bacteria could accumulate and at the same time provide for cleaning and replacement of gasket assemblies without interfering with the remainder of the construction.

Having described my invention reference should now be had to the following claims.

I claim:

1. In a mixing machine including a hopper with a power driven shaft journaled therethrough, rotatable in one direction adapted to carry a series of radial paddle blades and a co-axial oppositely rotatable power driven sleeve projected thereinto; a bushing between said shaft and sleeve, a split sealing gasket mounted on said shaft bearing against the end of said sleeve, and a co-axial gasket nut threaded onto the end of said sleeve including a central gasket retaining web, said web terminating in an internal annular tapered wiping edge slidably engageable with said shaft, and a pair of oppositely arranged spiral blades positioned radially outward of said paddle blades with their one ends joined to said sleeve and their other ends respectively journaled on said shaft.

2. A mixing machine of claim 1, said hopper including a pair of apertured upright end walls, bushings respectively mounted through said end walls and secured thereto co-axial of said sleeve and shaft, bearings within said bushings engaging said sleeve and shaft respectively, split sealing gaskets on said sleeve and shaft at the inner ends of said bushings within the hopper, and coaxial gasket nuts threaded onto the ends of said bushings, each nut including a central gasket retaining web with an internal annular tapered wiping edge slidably engageable with said sleeve and shaft respectively, said gasket nuts being unthreadable axially with respect to said sleeve and bushings to permit cleaning and replacing of gaskets.

3. A mixing machine of claim 1, a mounting hub secured to said sleeve, to which the one ends of said spiral blades are respectively secured, a second mounting hub journaled on said shaft with a bearing interposed, to which the other ends of said spiral blades are respectively secured, split sealing gaskets mounted on said shaft engaging opposite ends of said second hub, and gasket nuts on said shaft threaded onto opposite sides of the second hub, each nut including a gasket retaining web terminating in an inner annular tapered edge cooperatively engaging said shaft in wiping relation.

4. A mixing machine of claim 1, said hopper including a pair of apertured upright end walls, bushings respectively mounted through said end walls and secured thereto co-axial of said sleeve and shaft, bearings within said bushings engaging said sleeve and shaft respectively, split sealing gaskets on said sleeve and shaft at the inner ends of said bushings within the hopper, coaxial gasket nuts threaded onto the ends of said bushings, each nut including a central gasket retaining web with an internal annular tapered wiping edge slidably engageable with said sleeve and shaft respectively, a mounting hub secured to said sleeve, to which the one ends of said spiral blades are respectively secured, a second mounting hub journaled on said shaft with a bearing interposed, to which the other ends of said spiral blades are respectively secured, split sealing gaskets mounted on said shaft engaging opposite ends of said second hub, and gasket nuts on said shaft threaded onto opposite sides of the second hub, each nut including a gasket retaining web terminating in an inner annular tapered edge cooperatively engaging said shaft in wiping relation, the space between the first hub and the gasket nut for the adjacent end wall bushing and the space between the other end wall bushing gasket nut and adjacent hub gasket nut being such as to provide for axial unthreading of said gasket nuts to permit removal of the corresponding gaskets.

5. A mixing machine of claim 1, spaced hubs secured on said shaft adapted for mounting said paddle blades, and set screws on said hubs retainingly engaging said shaft, the set screw receiving apertures on each hub having a counterbore opening at its outer end, the heads of said screws being cylindrical and of a diameter to tightly fit into said counterbore openings.

References Cited in the file of this patent

UNITED STATES PATENTS

| | | |
|---|---|---|
| 31,806 | Hopkins | Mar. 26, 1861 |
| 168,384 | Duwel | Oct. 5, 1875 |
| 445,204 | Sacco | Jan. 27, 1891 |
| 540,962 | Duhrkap | June 11, 1895 |
| 713,088 | Friedrick | Nov. 11, 1902 |
| 952,031 | Dickson | Mar. 15, 1910 |
| 2,118,500 | Ferenic | May 24, 1938 |

FOREIGN PATENTS

| | | |
|---|---|---|
| 184,433 | Great Britain | Aug. 1, 1922 |